(12) United States Patent
Lee

(10) Patent No.: US 11,644,733 B2
(45) Date of Patent: May 9, 2023

(54) DISPLAY PANEL, DISPLAY APPARATUS AND METHOD OF FABRICATING DISPLAY PANEL

(71) Applicant: E Ink Holdings Inc., Hsinchu (TW)

(72) Inventor: Pei-Sheng Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 463 days.

(21) Appl. No.: 16/813,751

(22) Filed: Mar. 10, 2020

(65) Prior Publication Data
US 2020/0319523 A1   Oct. 8, 2020

(30) Foreign Application Priority Data

Apr. 3, 2019   (TW) ................. 108111805

(51) Int. Cl.
*G02F 1/167* (2019.01)
*G02F 1/16757* (2019.01)
(Continued)

(52) U.S. Cl.
CPC .......... *G02F 1/16755* (2019.01); *G02F 1/167* (2013.01); *G02F 1/1676* (2019.01); *G02F 1/1685* (2019.01); *G02F 1/16757* (2019.01)

(58) Field of Classification Search
CPC ................ G06F 3/0412; G06F 1/1652; G06F 2203/04108; G06F 3/0445; G06F 3/0446; G06F 2203/04102; G06F 3/04164; G06F 3/0443; G06F 2203/04103; G06F 2203/04107; G06F 2203/04112; G06F 3/041; G06F 1/1698; G06F 3/0447; G06F 1/1618; G06F 1/1637; G06F 1/1679; G06F 1/1681; G06F 1/1694; G06F 1/203;
(Continued)

(56) References Cited

U.S. PATENT DOCUMENTS 7,538,757 B2   5/2009   Zhou et al.
9,213,361 B1   12/2015  Urban
(Continued)

FOREIGN PATENT DOCUMENTS

| CN | 104350536 | 2/2015 |
|----|-----------|--------|
| CN | 108987455 | 12/2018 |
| CN | 109036291 | 12/2018 |

OTHER PUBLICATIONS

"Office Action of Taiwan Counterpart Application", dated Mar. 9, 2020, p. 1-8.

*Primary Examiner* — Brandi N Thomas
(74) *Attorney, Agent, or Firm* — JCIPRNET

(57) ABSTRACT

A display panel including a substrate, a thermal sensor, a plurality of sensing traces, a pixel layer, and a display medium layer is provided. The substrate has a display area. The thermal sensor is attached on the substrate. The sensing traces are disposed on the substrate and connected to the thermal sensor. The pixel layer disposed on the substrate includes a pixel structure and a plurality of signal lines. The pixel structure is disposed in the display area and connected to the signal lines. The signal lines of the pixel layer are independent from the sensing traces. The display medium layer is disposed on the substrate and the pixel layer is located between the display medium layer and the substrate. A display apparatus and a method of fabricating the display panel are also provided.

11 Claims, 17 Drawing Sheets

(51) Int. Cl.
*G02F 1/16755* (2019.01)
*G02F 1/1676* (2019.01)
*G02F 1/1685* (2019.01)

(58) Field of Classification Search
CPC ........ G06F 21/31; G06F 21/32; G06F 21/602;
G06F 3/04166; G06F 3/04182; G06F
3/04184; G06F 3/0421; G06F 3/0425;
G06F 3/044; G06F 1/1626; G06F 1/1656;
G06F 3/0416; G06F 3/0448; G02F
1/13338; G02F 1/134336; G02F
1/134372; G02F 1/13439; G02F 1/13454;
G02F 1/136204; G02F 1/133305; G02F
1/133382; G02F 1/133536; G02F
1/133538; G02F 1/133615; G02F
1/133631; G02F 1/133636; G02F
1/13306; G02F 1/13318; G02F 1/133512;
G02F 1/133606; G02F 1/133618; G02F
1/13394; G02F 1/13396; G02F 1/134309;
G02F 1/1351; G02F 1/1362; G02F 1/167;
G02F 1/1675; G02F 1/16755; G02F
1/16757; G02F 1/1676; G02F 1/1685
See application file for complete search history.

(56) References Cited

U.S. PATENT DOCUMENTS

| | | |
|---|---|---|
| 9,218,773 B2 | 12/2015 | Sun et al. |
| 9,513,742 B2 | 12/2016 | Kim et al. |
| 9,792,862 B2 | 10/2017 | Hung et al. |
| 9,857,914 B2 | 1/2018 | Kim et al. |
| 2007/0052665 A1 | 3/2007 | Zhou et al. |
| 2014/0071383 A1* | 3/2014 | Drolet .............. G09G 3/20 349/72 |
| 2015/0009191 A1* | 1/2015 | Nathan ............. G09G 3/3233 345/205 |
| 2015/0168223 A1 | 6/2015 | Hammond et al. |
| 2016/0092029 A1 | 3/2016 | Kim et al. |
| 2017/0023829 A1* | 1/2017 | Im .................. G02F 1/133617 |
| 2018/0090103 A1 | 3/2018 | Zhang et al. |

* cited by examiner

DISPLAY PANEL, DISPLAY APPARATUS AND METHOD OF FABRICATING DISPLAY PANEL

CROSS-REFERENCE TO RELATED APPLICATION

This application claims the priority benefit of Taiwan application serial no. 108111805, filed on Apr. 3, 2019. The entirety of the above-mentioned patent application is hereby incorporated by reference herein and made a part of this specification.

BACKGROUND OF THE INVENTION

Field of the Invention

The invention relates to a panel, an apparatus, and a method of fabricating the panel, and more particularly, to a display panel, a display apparatus, and a method of fabricating the display panel.

Description of Related Art

In recent years, electronic paper display panels have become a new choice in life to replace paper reading due to their advantages of being thin, durable, and energy-saving and environmentally-friendly. Electronic paper display panels may be found in electronic reading devices (e.g., e-books, electronic newspapers) or other electronic devices (e.g., electronic tags).

Temperature is one of the factors that affect the display effect and the performance of the electronic paper display apparatus. Most electronic paper display apparatuses have thermal sensors, and the thermal sensors are usually disposed on a flexible circuit board connected to the display panel. However, this configuration makes it uneasy for the thermal sensors to accurately sense the temperature on the panel, and the number and positions of the thermal sensors are limited by the mechanism design of the display apparatus. In view of this, how to accurately sense the temperature of the display panel has become one of the keys to improve display quality.

SUMMARY OF THE INVENTION

The invention provides a display panel having a thermal sensor with a greater margin for configuration.

The invention provides a display device having a thermal sensing function, and the thermal sensing accuracy thereof is high.

The display panel of the invention includes a substrate, a thermal sensor, a plurality of sensing traces, a pixel layer, and a display medium layer. The substrate has a display area. The thermal sensor is attached on the substrate. The sensing traces are disposed on the substrate and connected to the thermal sensor. The pixel layer disposed on the substrate includes a pixel structure and a plurality of signal lines. The pixel structure is disposed in the display area and connected to the signal lines. The signal lines of the pixel layer are independent from the sensing traces. The display medium layer is disposed on the substrate and the pixel layer is located between the display medium layer and the substrate.

The display apparatus of the invention includes a display panel and a flexible circuit board. The display panel includes a substrate, a thermal sensor, a plurality of sensing traces, a pixel layer, and a display medium layer. The substrate has a display area and a bonding area located in a periphery of the display area. The thermal sensor is attached on the substrate and located in the display area. The sensing traces are disposed on the substrate and connected to the thermal sensor. The pixel layer disposed on the substrate includes a pixel structure and a plurality of signal lines. The pixel structure is disposed in the display area and connected to the signal lines. The display medium layer is disposed on the substrate and the pixel layer is located between the display medium layer and the substrate. The flexible circuit board is bonded to the bonding area of the substrate.

In an embodiment of the invention, the thermal sensor of the display panel is located in the display area.

In an embodiment of the invention, the thermal sensor of the display panel is located between the substrate and the pixel layer.

In an embodiment of the invention, the plurality of sensing traces of the display panel are located between the pixel layer and the substrate.

In an embodiment of the invention, the display panel further includes an isolation layer. The isolation layer is disposed on the substrate and located between the plurality of sensing traces and the pixel layer.

In an embodiment of the invention, the plurality of sensing traces of the display panel are a same film layer as the plurality of signal lines of the pixel layer.

In an embodiment of the invention, the plurality of signal lines of the pixel layer of the display panel includes a scan line and a data line with an extending direction intersected an extending direction of the scan line. The plurality of sensing traces includes a ground line and a control line. A film layer of the ground line is the same as one of the scan line and the data line, and a film layer of the control line is the same as the other of the scan line and the data line.

In an embodiment of the invention, the substrate of the display panel is located between the thermal sensor and the pixel layer, and the substrate is located between the plurality of sensing traces and the pixel layer.

In an embodiment of the invention, the display panel further includes a protective layer. The protective layer is disposed on the substrate, and the thermal sensor and the plurality of sensing traces are interposed between the substrate and the protective layer.

In an embodiment of the invention, the substrate of the display panel has a groove, and the thermal sensor is buried in the groove.

In an embodiment of the invention, the display panel further includes a packaging layer. The packaging layer covers the display medium layer, and the display medium layer is interposed between the packaging layer and the substrate.

In an embodiment of the invention, the display apparatus further includes a driving circuit board. The flexible circuit board is connected between the driving circuit board and the display panel.

In an embodiment of the invention, the display apparatus further includes a thermal sensing control circuit. The thermal sensing control circuit is disposed on the driving circuit board, and the thermal sensing control circuit electrically communicates with the plurality of sensing traces via the flexible circuit board.

In an embodiment of the invention, a number of the thermal sensor of the display apparatus is a plurality, and the display apparatus further includes a multiplexer circuit. The multiplexer circuit is connected between the thermal sensing control circuit and the plurality of sensing traces.

In an embodiment of the invention, the multiplexer circuit of the display apparatus is disposed on the flexible circuit board.

In an embodiment of the invention, the multiplexer circuit of the display apparatus is integrated in the thermal sensing control circuit.

In an embodiment of the invention, a distance from the thermal sensor of the display apparatus to the bonding area is greater than a length of the flexible circuit board.

In an embodiment of the invention, the display medium layer of the display apparatus is an electronic paper display layer.

The method of fabricating the display panel of the invention includes the following steps. A substrate is provided. A thermal sensor is bonded to the substrate. A sensing trace and an isolation layer are fabricated on the substrate, wherein the sensing trace is located between the isolation layer and the substrate and connected to the thermal sensor. A pixel layer and a display medium layer are formed on the substrate, wherein the pixel layer is located between the display medium layer and the substrate, and the pixel layer includes a pixel structure and a plurality of signal lines.

In an embodiment of the invention, the method of fabrication further includes the following step. A groove is fabricated on the substrate, wherein the thermal sensor is disposed in the groove.

In an embodiment of the invention, the groove is formed on the substrate via an etching process.

In an embodiment of the invention, a method of bonding the thermal sensor to the substrate includes deposition sintering, soldering, or adhesion.

Based on the above, the display panel and the display apparatus of an embodiment of the invention have the thermal sensor attached on the substrate, and the sensing traces connected to the thermal sensors are electrically independent from the data lines and the scan lines electrically connected to the pixel structures. Therefore, the accuracy of thermal sensing may be effectively improved, thus improving display quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
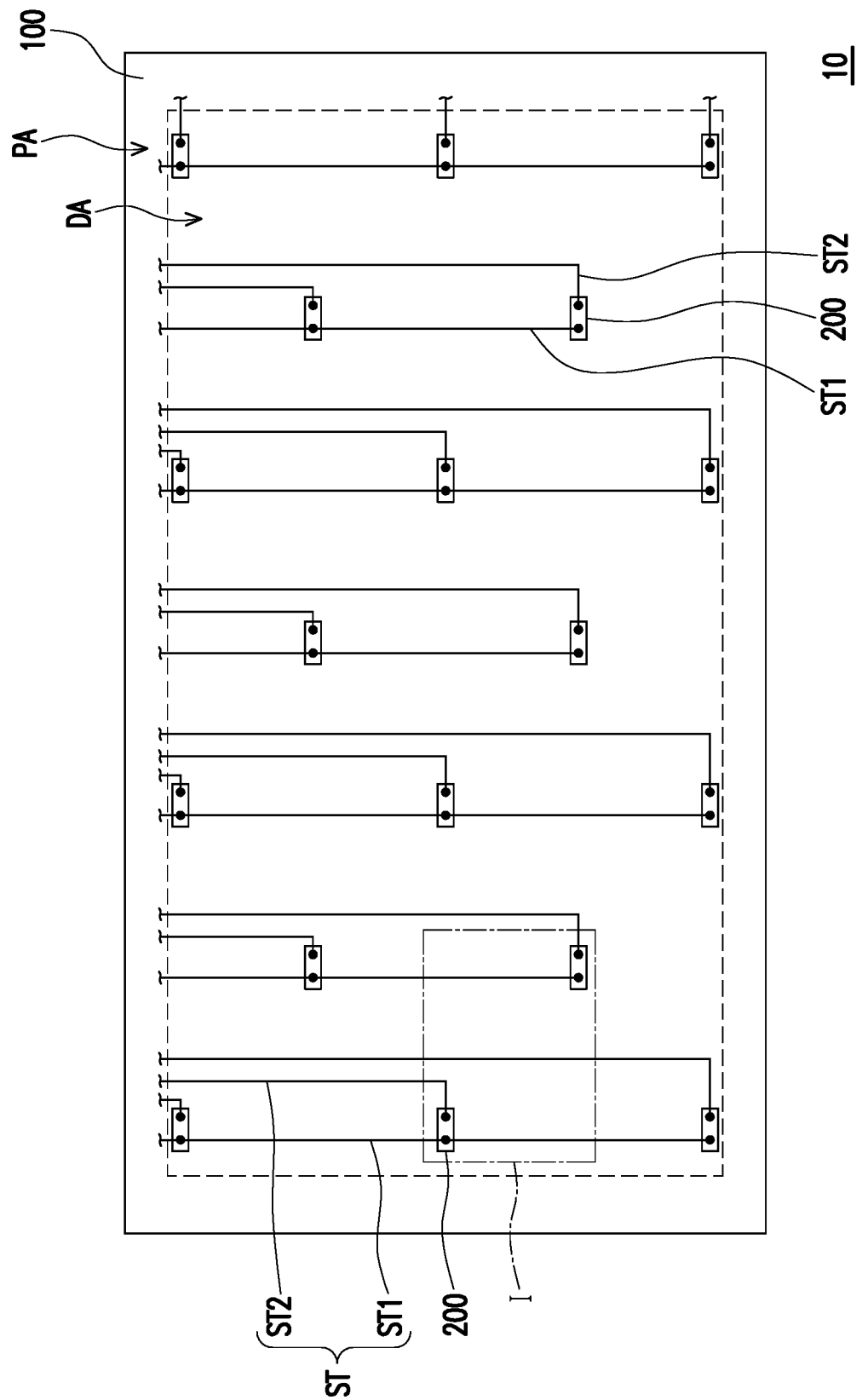
FIG. 1 is a top view of a display panel of the first embodiment of the invention.

In the figures, for clarity, the thicknesses of, for instance, layers, films, panels, and regions are enlarged. It should be understood that, when a layer, film, region, or an element of a substrate is "on" another element or "connected to" another element, the element may be directly on the other element or connected to the other element, or an intermediate element may also be present. On the other hand, when an element is "directly on another element" or "directly connected to" another element, an intermediate element is not present. As used in the present specification, "connected to" may refer to a physical and/or electrical connection. Furthermore, "electrically connected" may mean that other elements are present between two elements.

Hereinafter, exemplary embodiments of the invention are described in detail, and examples of the exemplary embodiments are conveyed via the figures. Wherever possible, the same reference numerals are used in the figures and the descriptions to refer to the same or similar parts.

Figure 2:
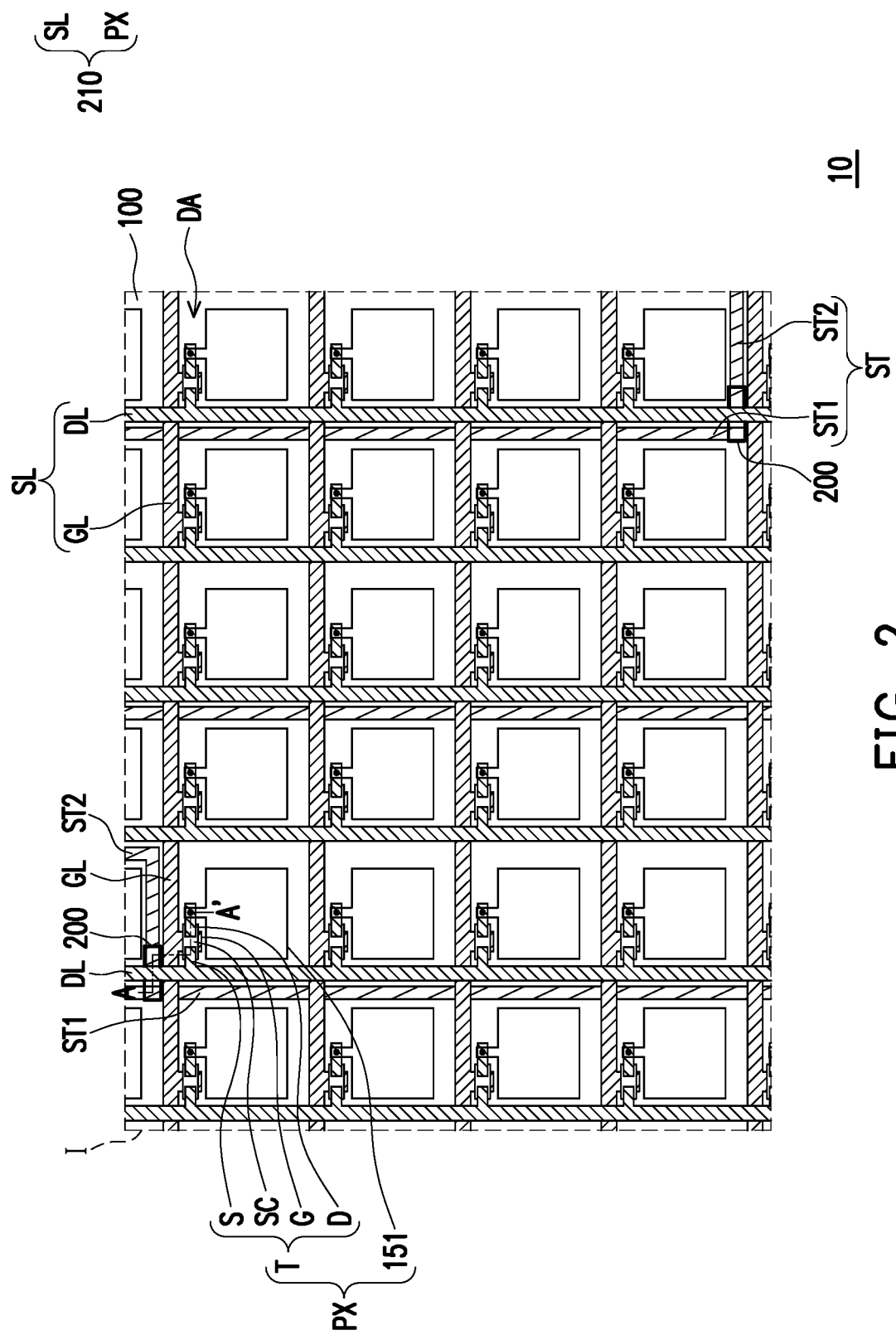
FIG. 2 is an enlarged view of a partial area I of the display panel of FIG. 1.
Figure 3:
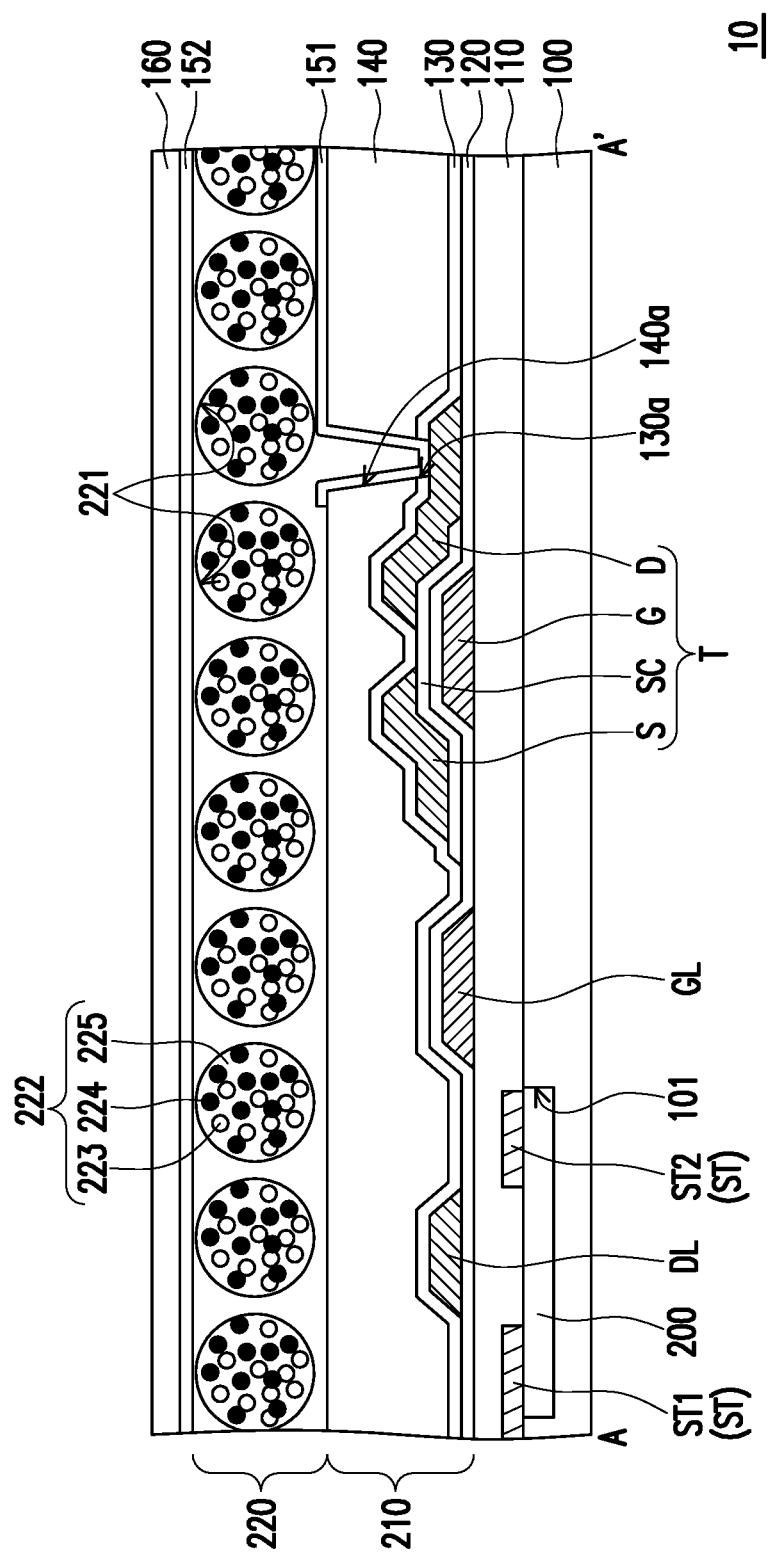
FIG. 3 is a schematic view showing the cross section of the display panel of FIG. 2.

FIG. 1 is a top view of a display panel 10 of the first embodiment of the invention. FIG. 2 is an enlarged view of a partial area I of the display panel 10 of FIG. 1. FIG. 3 is a cross section of the display panel 10 of FIG. 2. FIG. 3 corresponds to section line A-A' of FIG. 2. It should be noted that, for clarity of presentation, FIG. 1 omits the illustration of a pixel layer 210 of FIG. 2, and FIG. 2 omits the illustration of an isolation layer 110, a gate insulating layer 120, an insulating layer 130, a planarization layer 140, a display medium layer 220, a second electrode 152, and a packaging layer 160 of FIG. 3.

As may be seen from FIG. 1, the display panel 10 has a display area DA and a peripheral area PA surrounding the display area DA. The display panel 10 includes a substrate 100, a plurality of thermal sensors 200, and a plurality of sensing traces ST. In the present embodiment, the thermal sensors 200 may be optionally disposed in the display area DA, and the plurality of thermal sensors 200 may be arranged in an array on the substrate 100, but the invention is not limited thereto. It should be noted that the number of the thermal sensors 200 of the present embodiment is for illustrative purposes only, and the invention is not limited in this regard. In some embodiments, the number and location of the thermal sensors 200 may be adjusted according to actual design requirements. For example, the thermal sensors 200 may be positioned where heat source is easily generated in the display panel 10 during operation, such as where the driving circuit boards, the control chips, or the bus bars are provided or where the circuit traces are densely arranged. In the present embodiment, the thermal sensors 200 may include, for example, a thermal sensitive resistance, that is, the thermal sensors 200 may be resistive thermal detectors (RTD).

The plurality of sensing traces ST are disposed on the substrate 100 and connected to the thermal sensors 200. The plurality of sensing traces ST includes, for example, ground lines ST1 and control lines ST2. The thermal sensors 200 are connected between the ground lines ST1 and the control lines ST2. In some embodiments, a number of thermal sensors 200 may be optionally connected to the same ground line ST1, and respectively connected to corresponding control lines ST2, but the invention is not limited thereto. In addition, in the present embodiment, the ground lines ST1 and the control lines ST2 may optionally belong to the same conductive layer, and therefore, the extending direction of each ground line ST1 is not intersected with the extending direction of each control line ST2, that is, the extending direction of each ground line ST1 may substantially be parallel to the control lines ST2, but the invention is not limited thereto.

In the present embodiment, based on conductivity considerations, the material of the sensing traces ST is generally a metal material. However, the invention is not limited thereto. According to other embodiments, the sensing traces ST may also use other conductive materials such as a metal alloy, a metal nitride material, a metal oxide material (e.g., indium tin oxide, indium zinc oxide, or other transparent conductive materials), a metal oxynitride material, other suitable materials, or stacked layers of a metal material and other conductive materials.

Referring to FIG. 2 and FIG. 3, the display panel 10 further includes the pixel layer 210 disposed on the substrate 100. In the present embodiment, a plurality of thermal sensors 200, a plurality of the ground lines ST1, and a plurality of the control lines ST2 may optionally be disposed between the substrate 100 and the pixel layer 210. In addition, as shown in FIG. 3, the substrate 100 may optionally have a groove 101, and one thermal sensor 200 may be buried in the groove 101, but the invention is not limited thereto. For example, the thermal sensor 200 may be embedded on the substrate 100 via a means of sintering or attached in the groove 101 of the substrate 100 via an adhesive material.

In the embodiment, the pixel layer 210 includes a plurality of pixel structures PX and a plurality of signal lines SL disposed in the display area DA. The plurality of pixel structures PX may be arranged in an array on the substrate 100. The plurality of signal lines SL is electrically independent from the sensing traces ST. The plurality of signal lines SL includes, for example, a plurality of scan lines GL and a plurality of data lines DL, and the extending direction of each scan line GL is intersected with the extending direction of each data line DL. Each of the pixel structures PX may be connected to a corresponding scan line GL and a corresponding data line DL. In the present embodiment, the extending directions of the ground line ST1 and the control line ST2 may substantially be optionally parallel to the extending direction of the data lines DL, but the invention is not limited thereto.

In the present embodiment, based on conductivity considerations, the material of the signal lines SL is generally a metal material. However, the invention is not limited thereto, and according to other embodiments, the signal lines SL may also be made by using other conductive materials such as a metal alloy, a metal nitride material, a metal oxide material, a metal oxynitride material, other suitable materials, or stacked layers of a metal material and other conductive materials.

Referring to FIG. 3, each of the pixel structures PX may include an active device T disposed on the substrate 100. The active device T has a gate G, a source S, a drain D, and a semiconductor SC. The pixel layer 210 further includes a gate insulating layer 120 disposed between the gate G and the semiconductor SC. For example, in the present embodiment, the gate G of the active device T may be optionally disposed below the semiconductor SC to form a bottom-gate TFT, but the invention is not limited thereto. According to other embodiments, the gate G of the active device T may also be disposed above the semiconductor SC to form a top-gate TFT.

In the present embodiment, the material of the semiconductor SC is, for example, an amorphous silicon semiconductor, an organic semiconductor or a metal oxide semiconductor; that is, the active device T may be an amorphous silicon TFT (a-Si TFT), an organic TFT or a metal oxide TFT. However, the invention is not limited thereto, and in other embodiments, the material of the semiconductor SC includes, for example, a polycrystalline silicon semiconductor; that is to say, the active device T may also be a polycrystalline silicon TFT.

The source S and the drain D of the active device T respectively cover and are electrically connected to two different areas of the semiconductor SC. In the present embodiment, the gate G and the source S of the active device T may be connected to the scan lines GL and the data lines DL, respectively. For example, the gate G of the active device T and the scan lines GL may optionally belong to the same film layer, and the source S, the drain D, and the data lines DL of the active device T may optionally belong to the same film layer.

The pixel layer 210 may also optionally include the insulating layer 130 and the planarization layer 140. The insulating layer 130 covers the data line DL, the source S and the drain D of the active device T, and a portion of the surface of the gate insulating layer 120. The planarization layer 140 is disposed on the insulating layer 130. The insulating layer 130 and the planarization layer 140 respectively have an opening 130a and an opening 140a overlapped with the drain D of the active device T. For example, the sidewall of the insulating layer 130 defining the opening 130a may be substantially aligned with the sidewall of the planarization layer 140 defining the opening 140a, but the invention is not limited thereto. The pixel structure PX may further include a first electrode 151 disposed on the planarization layer 140. The first electrode 151 covers a portion of the surface of the planarization layer 140 and may continuously extend above the planarization layer to the upper surface of the drain D 140 to be electrically connected to the drain D 140 by conforming to the sidewall of the planarization layer 140 defining the opening 140a and the sidewall of the insulating layer 130 defining the opening 130a.

It should be noted that the gate G, the source S, the drain D, the gate insulating layer 120, the insulating layer 130, and the planarization layer 140 may respectively be implemented by any gate, any source, any drain, any gate insulating layer, any insulating layer, and any planarization layer for a display panel known to those skilled in the art, and the gate G, the source S, the drain D, the gate insulating layer 120, the insulating layer 130, and the planarization layer 140 may respectively be formed by any method known to those skilled in the art, and thus are not repeated herein.

As shown in FIG. 3, the display panel 10 may also optionally include the isolation layer 110 disposed on the substrate 100 and located between the sensing traces ST and the pixel layer 210. The isolation layer 110 covers the ground line ST1, the control line ST2, and the thermal sensors 200, so that the thermal sensors 200 and the plurality of sensing traces ST are electrically independent from the pixel layer 210. In the present embodiment, the material of the isolation layer 110 includes an inorganic material (for example: silicon oxide, silicon nitride, silicon oxynitride, other suitable materials, or stacked layers of at least two of the above materials), an organic material, or other suitable materials, or a combination of the above.

The display panel 10 further includes the display medium layer 220 and the second electrode 152 disposed on the substrate 100. The display medium layer 220 is located between the pixel layer 210 and the second electrode 152, and the second electrode 152 covers the display medium layer 220. A portion of the display medium layer 220 is interposed between the first electrode 151 and the second electrode 152. In the present embodiment, the display medium layer 220 may be an electronic paper display layer. For example, the electronic paper display layer may optionally include a plurality of microcapsules 221 and an electronic ink 222 filled in the microcapsules 221. FIG. 3 shows that, the electronic ink 222 may optionally include a plurality of white particles 223, a plurality of black particles 224, and a transparent liquid 225, and one of the white particles 223 and the black particles 224 may be positively charged and the other negatively charged. That is, the display medium layer 220 may be an electrophoretic electronic paper display layer. However, the invention is not limited thereto, and in some embodiments, the electronic ink 222 may also contain a plurality of charged particles of different colors. In some other embodiments, the display medium layer 220 may also be a liquid crystal display layer or an organic electroluminescent display layer.

In the present embodiment, the first electrode 151 and the second electrode 152 are, for example, light transmissive electrodes, and the material of the light transmissive electrodes includes a metal oxide such as indium tin oxide, indium zinc oxide, aluminum tin oxide, aluminum zinc oxide, or other suitable oxides, or stacked layers of at least two of the foregoing. However, the invention is not limited thereto. In other embodiments, the first electrode 151 may be a reflective electrode, and the material of the reflective electrode includes a metal, an alloy, a metal nitride material, a metal oxide material, a metal oxynitride material, or other suitable materials, or stacked layers of a metal material and other conductive materials. Alternatively, in some other embodiments, the first electrode 151 may be a light transmissive electrode and the display panel 10 may further include a reflective layer, wherein the reflective layer and the display dielectric layer 220 are located at two opposite sides of the first electrode 151.

The display panel 10 may also optionally include the packaging layer 160 that covers the second electrode 152. The display medium layer 220 is interposed between the packaging layer 160 and the pixel layer 210. In the present embodiment, the material of the packaging layer 160 may include silicon nitride, aluminum oxide, aluminum oxynitride, silicon oxynitride, acrylic resin, hexamethyldisiloxane (HMDSO), polyethylene terephthalate (PET) or glass.

Figure 4A:
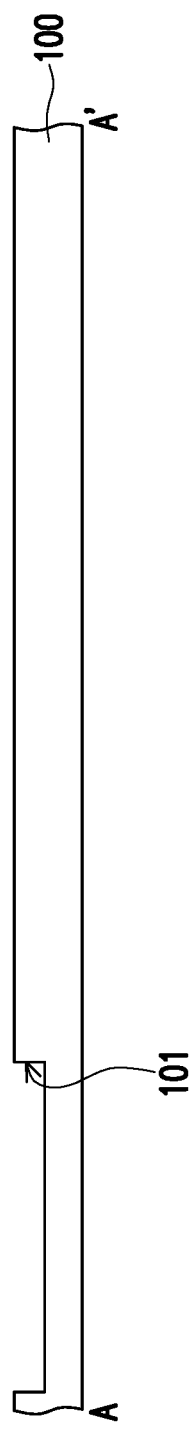
FIG. 4A to FIG. 4D are schematic views showing the cross sections of a fabrication process of the display panel of FIG. 3.
Figure 4B:
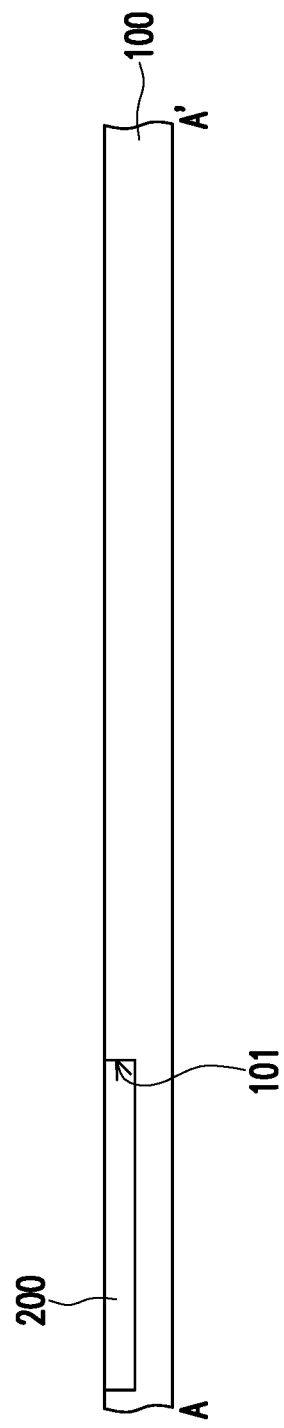

FIG. 4A to FIG. 4D are cross sections of a fabrication process of the display panel 10 of FIG. 3. In the present embodiment, the groove 101 (shown in FIG. 4A) is formed on the substrate 100 first, and the thermal sensors 200 are placed in the groove 101. In particular, the groove 101 may be fabricated by using an etching process, and the thermal sensors 200 may be fabricated first and then transferred into the groove 101 of the substrate 100 (as shown in FIG. 4B). In particular, the thermal sensors 200 may be bonded to the substrate 100 via deposition sintering, soldering, or other suitable means. Alternatively, the thermal sensors 200 may be directly fabricated in the groove 101 by means of film forming process or the like. In some embodiments, the thermal sensors 200 may be attached on the substrate 100 via an adhesive layer.

Figure 4C:
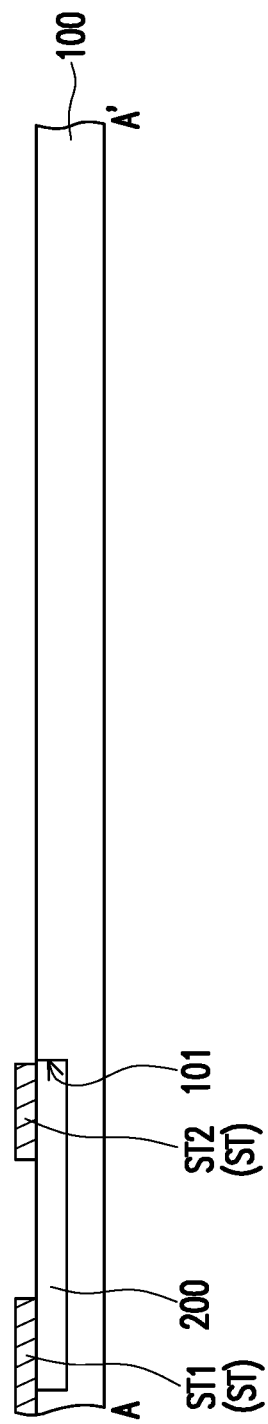
Figure 4D:
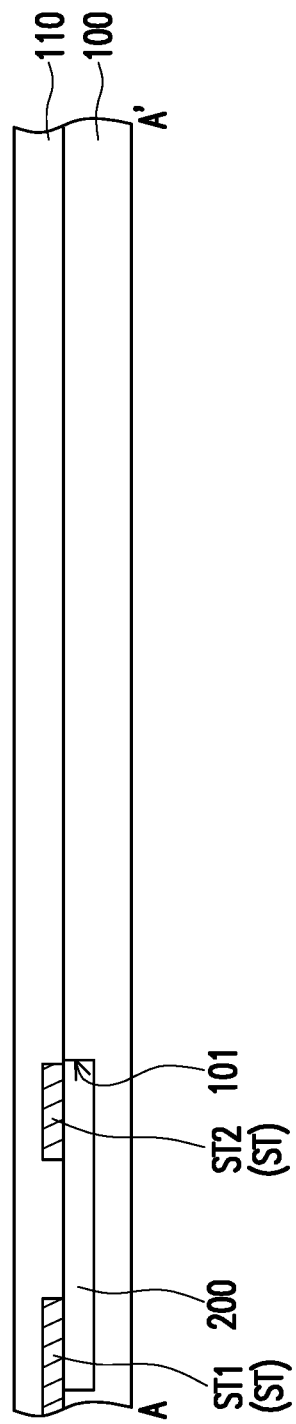

After the thermal sensors 200 are bonded to the substrate 100, the fabrication of the sensing traces ST (as shown in FIG. 4C) and the fabrication of the isolation layer 110 (as shown in FIG. 4D) are sequentially performed. In the present embodiment, the material of the ground line ST1 and the control line ST2 may be indium-tin oxide (ITO) and may be fabricated by a photolithography-etching process. Alternatively, the isolation layer 110 may be optionally formed by a method of physical deposition or chemical deposition.

It is worth mentioning that the isolation layer 110 here may have good insulating properties, so that the sensing traces ST and the subsequently formed pixel layer 210 are electrically isolated from each other. In addition, the isolation layer 110 has a smooth surface at the side away from the thermal sensors 200, which helps to improve the production yield of a subsequent process. Further, after the isolation layer 110 is formed, the fabrication of the pixel layer 210, the display medium layer 220, the second electrode 152, and the packaging layer 160 may be sequentially performed to form the display panel 10 as shown in FIG. 3.

Figure 5:
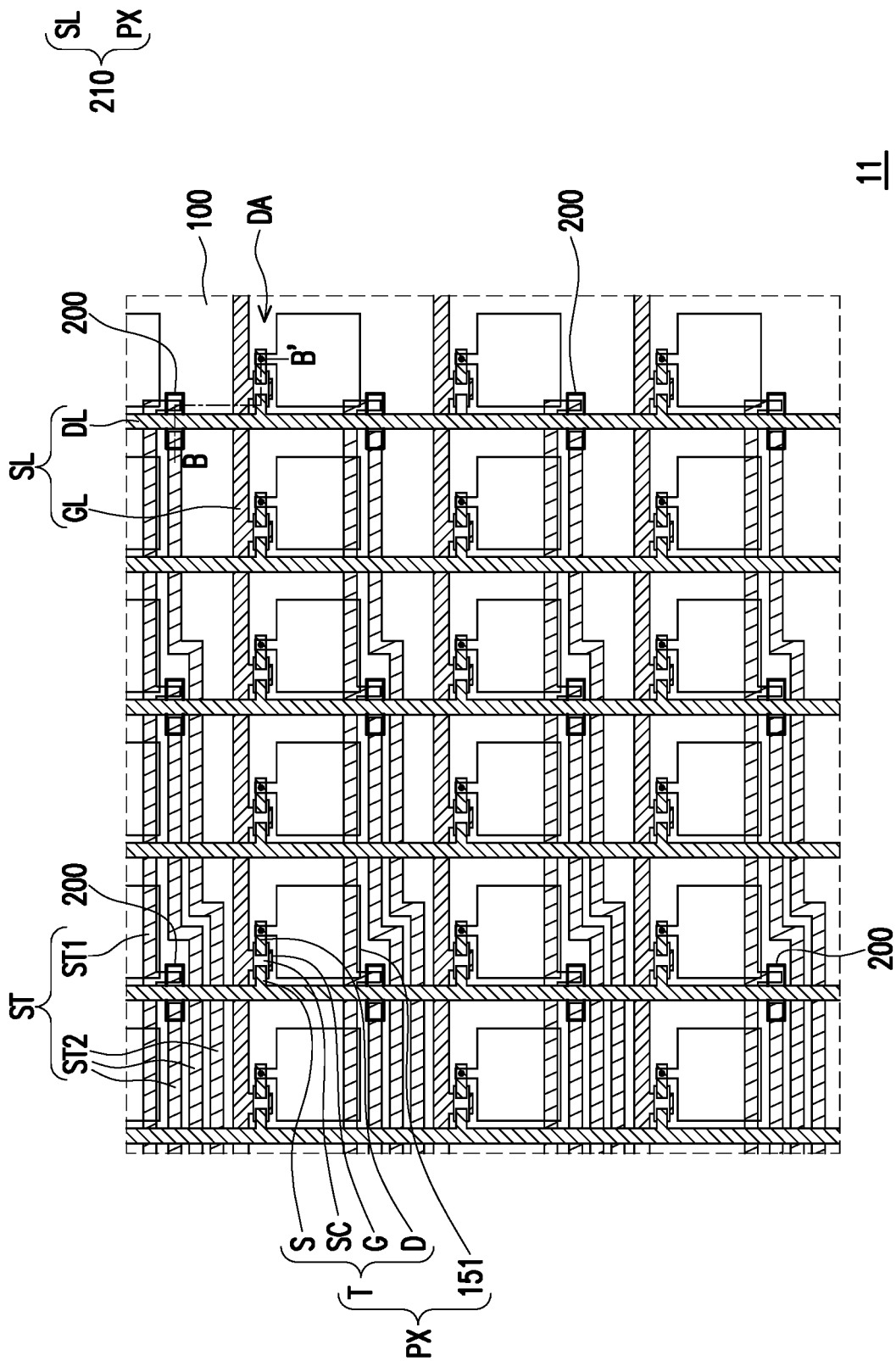
FIG. 5 is a top view of a display panel of the second embodiment of the invention.

FIG. 5 is a top view of a display panel 11 of the second embodiment of the invention. FIG. 6A to FIG. 6D are cross sections of a fabrication process of the display panel 11 of FIG. 5. FIG. 6D corresponds to section line B-B' of FIG. 5. It should be noted that, for clarity of presentation, FIG. 5 omits the illustration of the isolation layer 110, the gate insulating layer 120, the insulating layer 130, the planarization layer 140, the display medium layer 220, the second electrode 152, and the packaging layer 160 of FIG. 6D.

Referring to FIG. 5 and FIG. 6D, the difference between the display panel 11 of the present embodiment and the display panel 10 of the first embodiment is that the thermal sensors 200 of the display panel 11 are not embedded in a substrate 100A, that is, the substrate 100A is not provided with a groove for accommodating the thermal sensors 200. Further, in the present embodiment, the extending direction of the sensing traces ST (i.e., the ground line ST1 and the control line ST2) is substantially parallel to the extending direction of the scan lines GL. The fabrication flow of the display panel 11 is exemplarily described below.

Figure 6A:
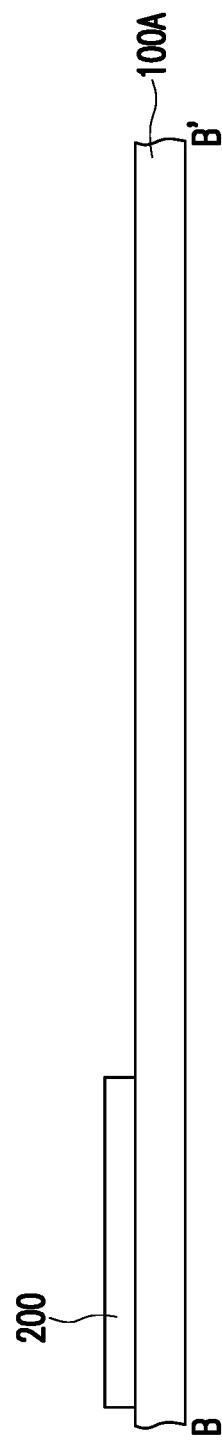
FIG. 6A to FIG. 6D are schematic views showing the cross sections of a fabrication process of the display panel of FIG. 5.
Figure 6B:
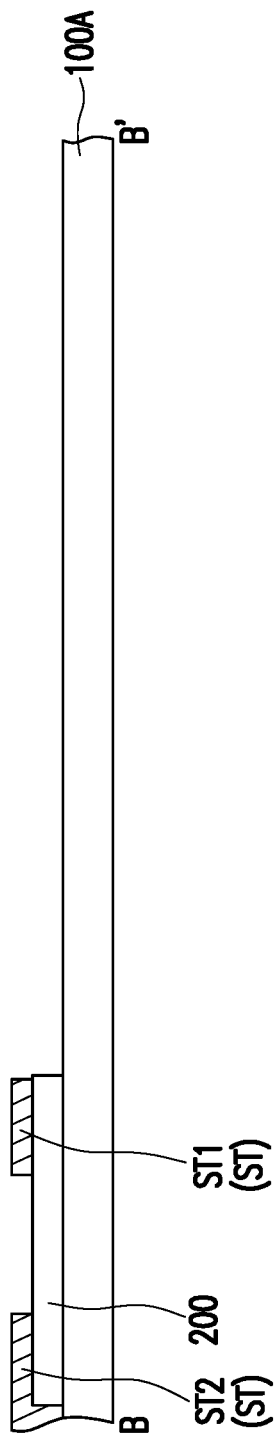
Figure 6C:
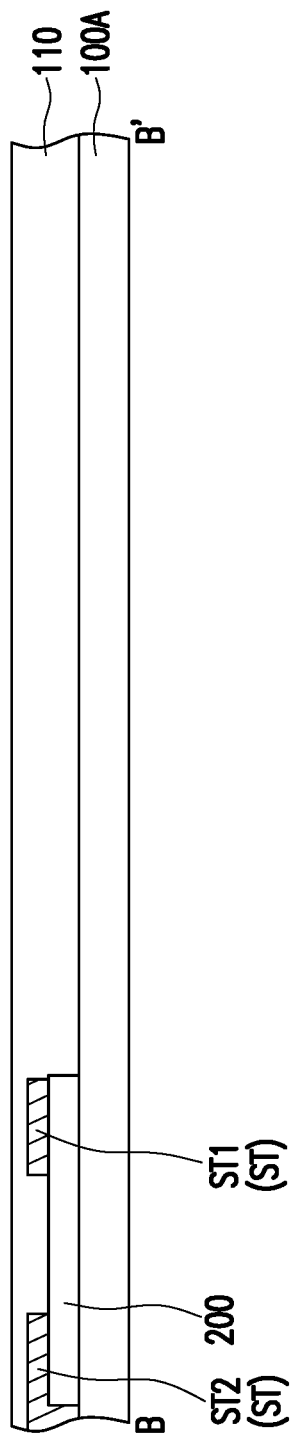
Figure 6D:
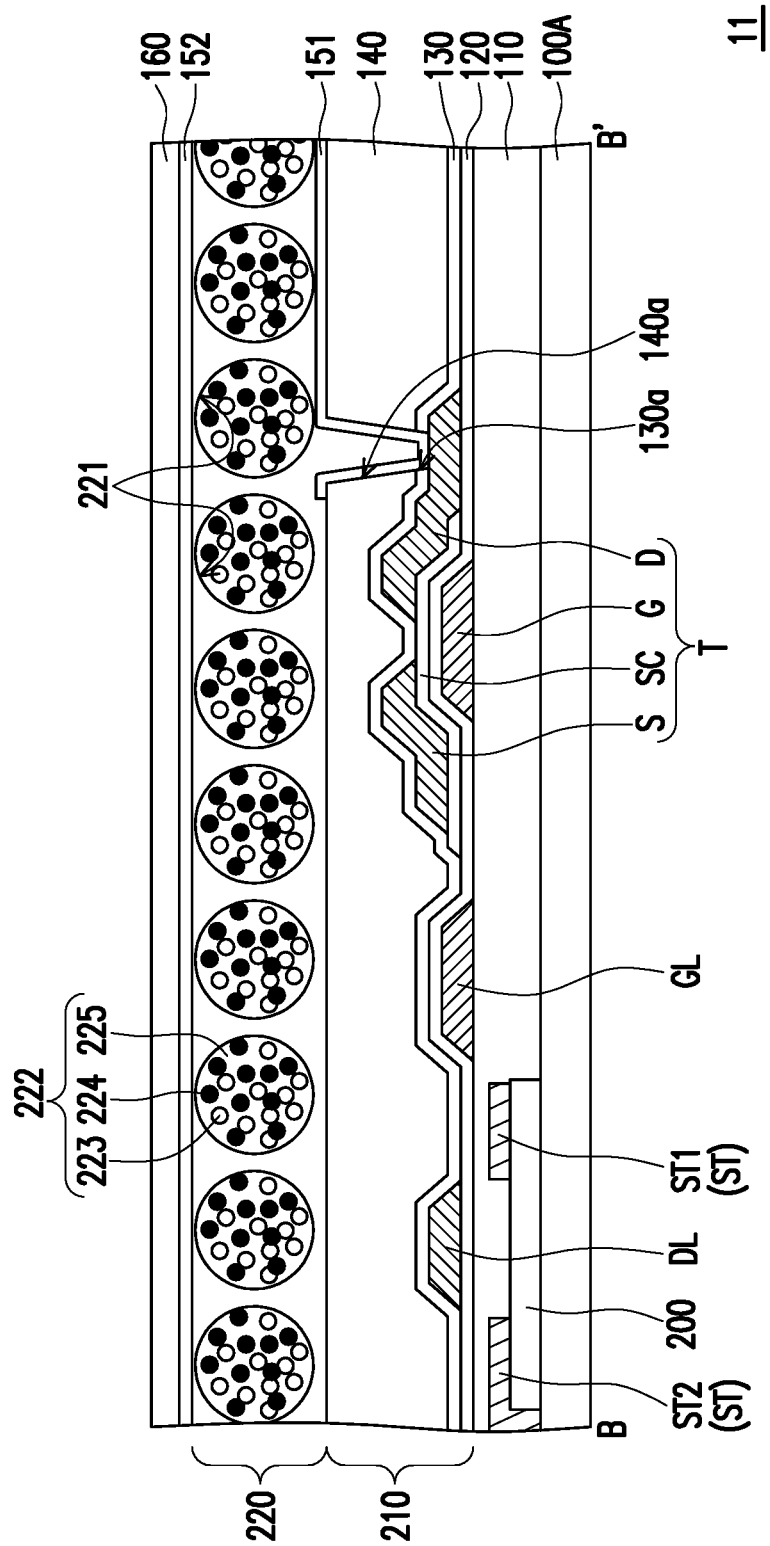

In the present embodiment, the thermal sensors 200 of the display panel 11 may be transferred onto the substrate 100A after being fabricated (as shown in FIG. 6A), wherein the thermal sensors 200 may be bonded to the substrate 100A via deposition sintering, soldering, or other suitable means. In some embodiments, the thermal sensors 200 may be attached on the substrate 100A via an adhesive layer. After the thermal sensors 200 are bonded to the substrate 100A, the fabrication of the sensing traces ST (as shown in FIG. 6B) and the fabrication of the isolation layer 110 (as shown in FIG. 6C) are sequentially performed. In the present embodiment, the material of the ground line ST1 and the control line ST2 may be indium-tin oxide (ITO) and may be fabricated by a photolithography process. Alternatively, the isolation layer 110 may be optionally formed by a method of physical deposition or chemical deposition.

It is worth mentioning that the isolation layer 110 here may have good insulating properties, so that the sensing traces ST and the subsequently formed pixel layer 210 are electrically isolated from each other. In addition, the isolation layer 110 has a smooth surface at the side away from the thermal sensors 200, which helps to improve the production yield of a subsequent process. Referring to FIG. 6D, after the isolation layer 110 is formed, the fabrication of the pixel layer 210, the display medium layer 220, the second electrode 152, and the packaging layer 160 may be sequentially formed, wherein the composition, material type, and configuration relationship of the pixel layer 210, the display medium layer 220, the second electrode 152, and the packaging layer 160 are all similar to those of the display panel 10 of the foregoing embodiments. Refer to the foregoing embodiments for related technical description, which is not repeated herein. At this point, the display panel 11 of the present embodiment is completed.

Figure 7:
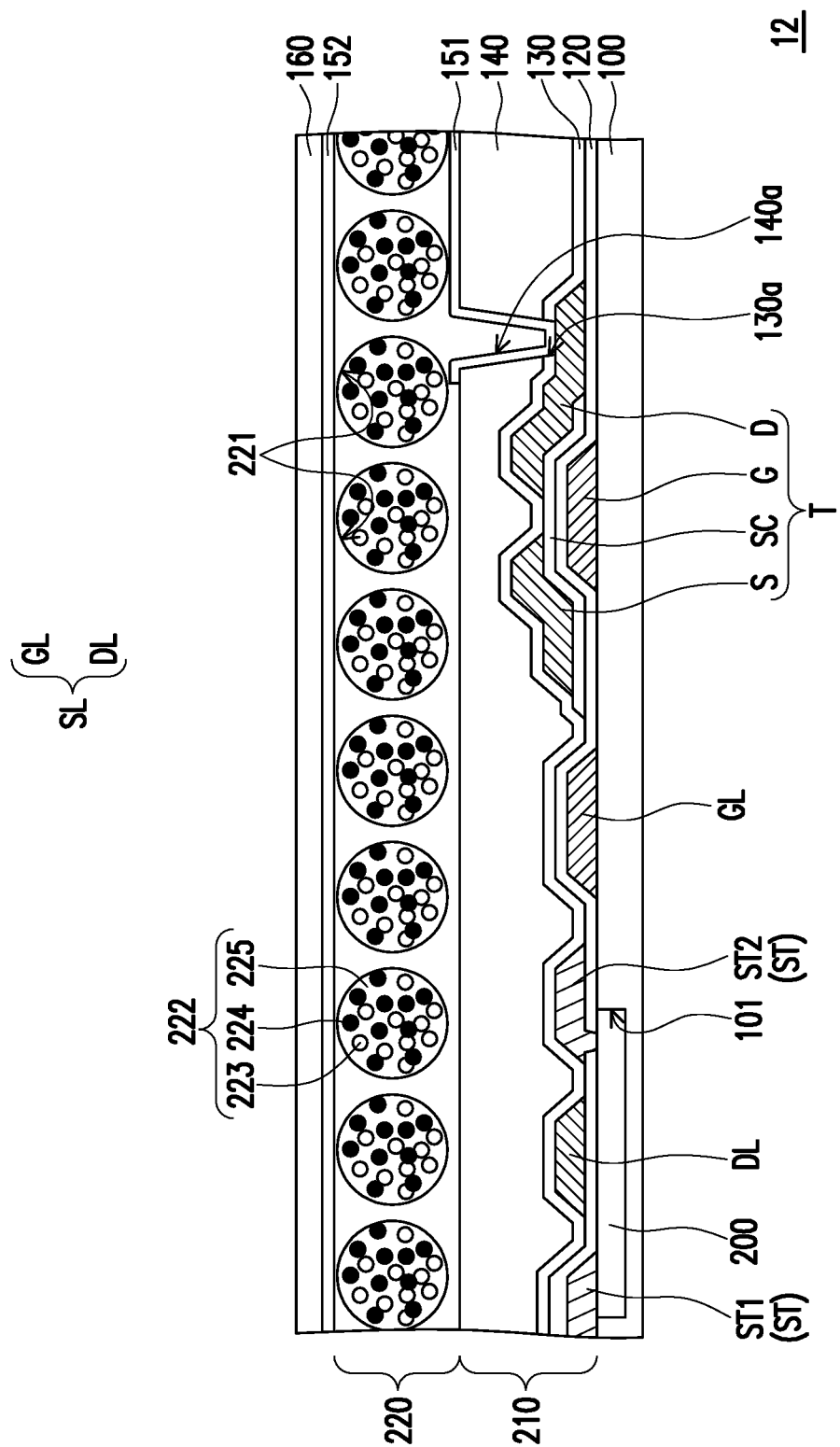
FIG. 7 is a cross section of a display panel of the third embodiment of the invention.

FIG. 7 is a cross section of a display panel 12 of the third embodiment of the invention. Referring to FIG. 7, the difference between the display panel 12 of the present embodiment and the display panel 10 of FIG. 3 is that the plurality of sensing traces ST of the display panel 12 and the plurality of signal lines SL of the pixel layer 210 may belong to the same film layer, that is, the sensing traces ST may be optionally integrated to the pixel layer 210. Therefore, the display panel 12 may not have the isolation layer 110, and the process of fabricating the thermal sensors 200 in the groove 101 is the same as that of the embodiment of FIG. 3, which is not repeated herein.

In the present embodiment, the ground line ST1 and the scan line GL may optionally belong to the same film layer. The control line ST2 and the data line DL may optionally belong to the same film layer, and the control line ST2 passes through the gate insulating layer 120 and is electrically connected to the corresponding thermal sensor 200, but the invention is not limited thereto. In some embodiments, the ground line ST1 and the data line DL may also belong to the same film layer, and the control line ST2 and the scan line GL may also belong to the same film layer. In this way, the process may be simplified, thus reducing the installation cost of the thermal sensing members.

Figure 8:
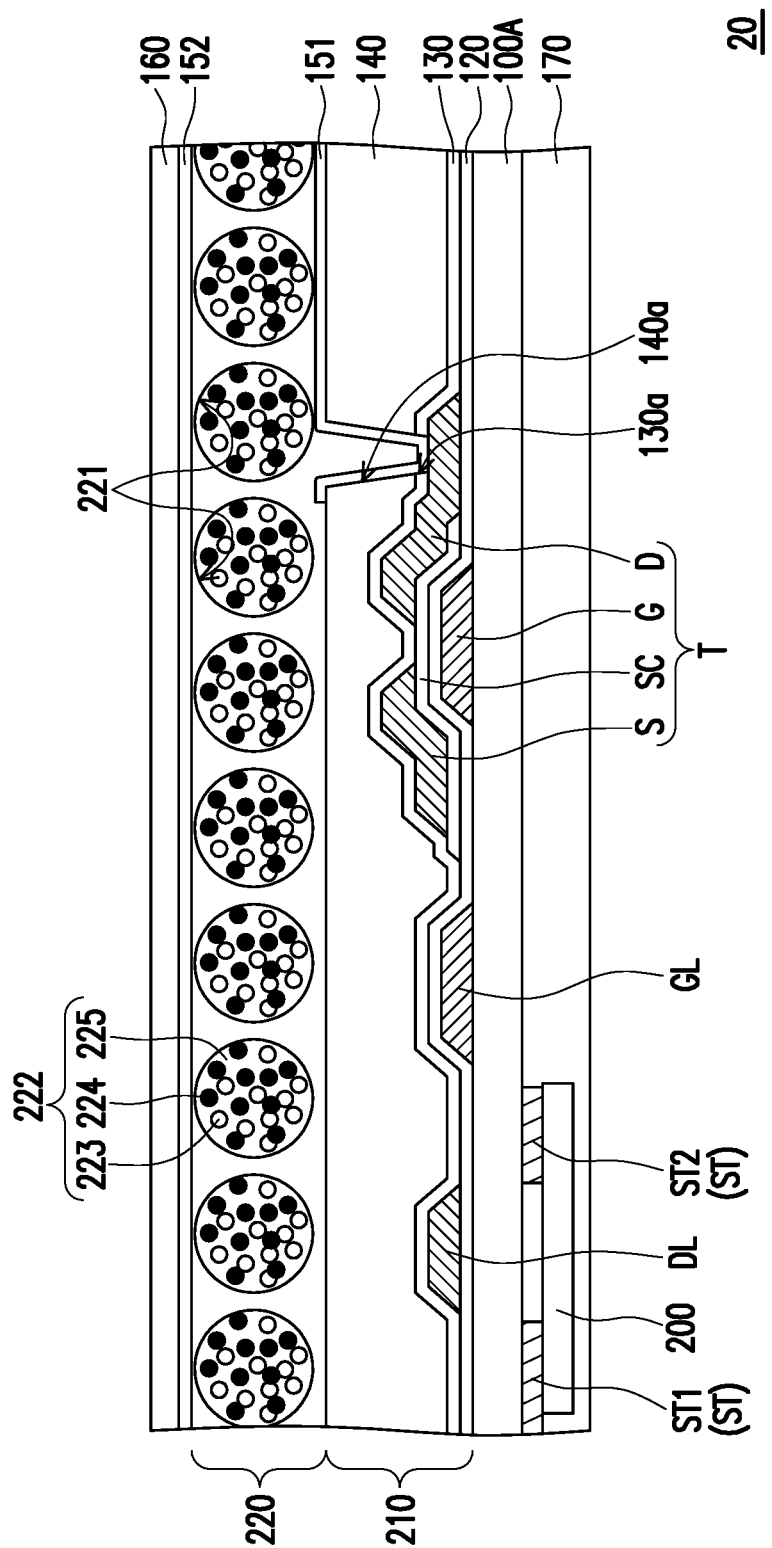
FIG. 8 is a cross section of a display panel of the fourth embodiment of the invention.

FIG. 8 is a cross section of a display panel 20 of the fourth embodiment of the invention. Referring to FIG. 8, the difference between the display panel 20 of the present embodiment and the display panel 10 of FIG. 3 is that the substrate 100A of the display panel 20 is located between the thermal sensors 200 and the pixel layer 210, and the substrate 100A is located between the sensing traces ST and the pixel layer 210. In addition, the display panel 20 may also optionally include a protective layer 170 disposed on the substrate 100A. The protective layer 170 covers the thermal sensors 200 and the sensing traces ST. That is, the thermal sensors 200 and the sensing traces ST are located between the substrate 100A and the protective layer 170.

In the process of the present embodiment, the sensing traces ST may be first fabricated on the substrate 100A, and then the thermal sensor 200 is disposed on the sensing traces ST, and finally the protective layer 170 is covered on the thermal sensor 200 and the sensing traces ST. In the present embodiment, the sensing traces ST may be optionally disposed between the thermal sensor 200 and the substrate 100A, but the invention is not limited thereto. In another embodiment, the thermal sensor 200 of the display panel 20 may be fabricated beforehand, and after the sensing trace ST, the pixel layer 210, the display medium layer 220, the second electrode 152, and the packaging layer 160 are completed, the thermal sensor 200 is transferred to the substrate 100A and attached on the sensing traces ST.

Figure 9:
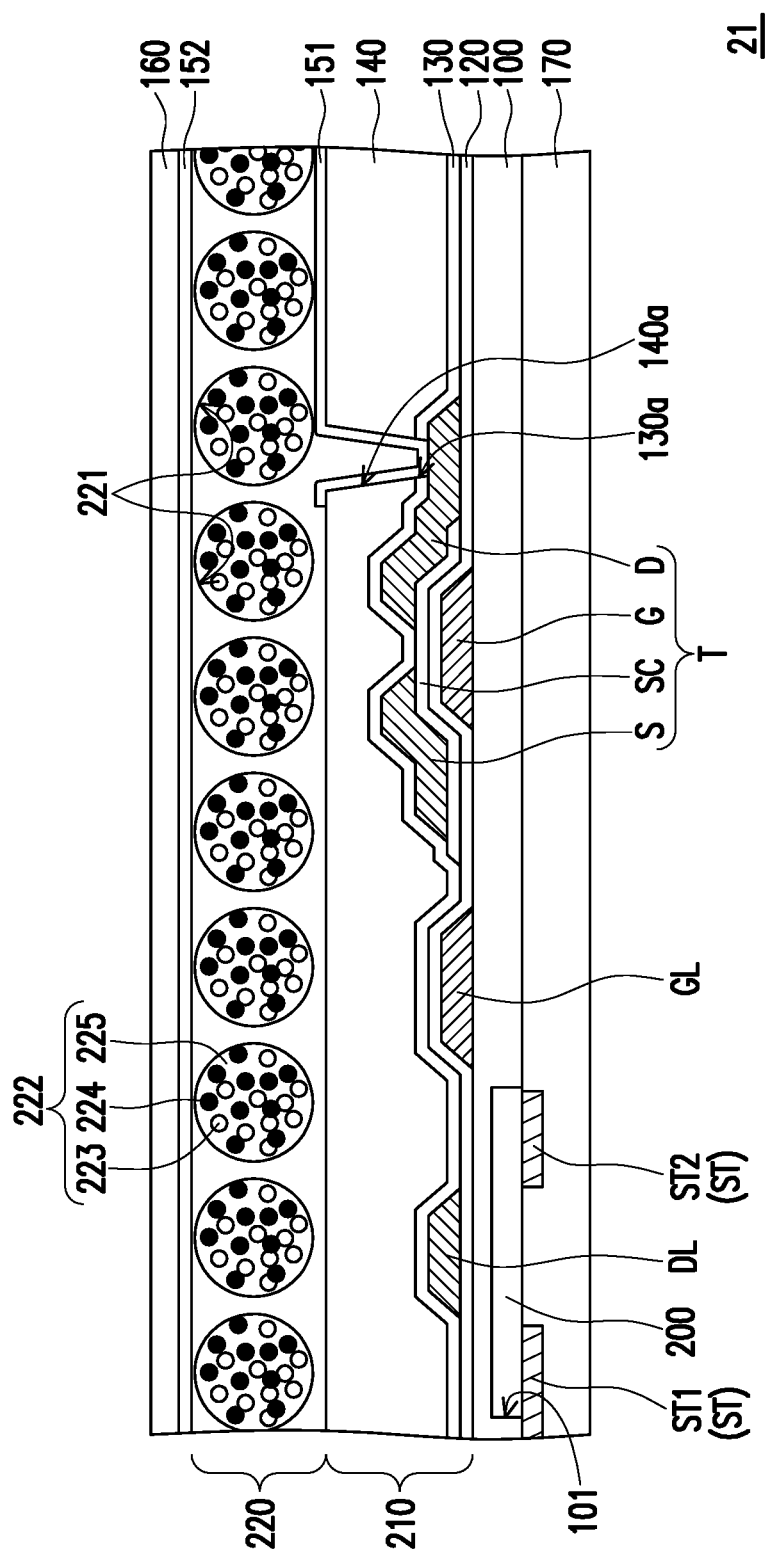
FIG. 9 is a schematic view showing the cross section of a display panel of the fifth embodiment of the invention.

FIG. 9 is a cross section of a display panel 21 of the fifth embodiment of the invention. Referring to FIG. 9, the difference between the display panel 21 of the present embodiment and the display panel 20 of FIG. 8 is that the substrate 100 of the display panel 21 may optionally have the groove 101, the thermal sensor 200 may be buried in the groove 101, and the thermal sensor 200 is located between the substrate 100 and the sensing traces ST. For example, the thermal sensor 200 may be embedded on the substrate 100 by means of sintering. The process of fabricating the thermal sensor 200 in the groove 101 is the same as that of the embodiment of FIG. 3, and is not repeated herein. After the thermal sensor 200 is fabricated, the sensing traces ST and the protective layer 170 are sequentially fabricated on the substrate 100.

Figure 10:
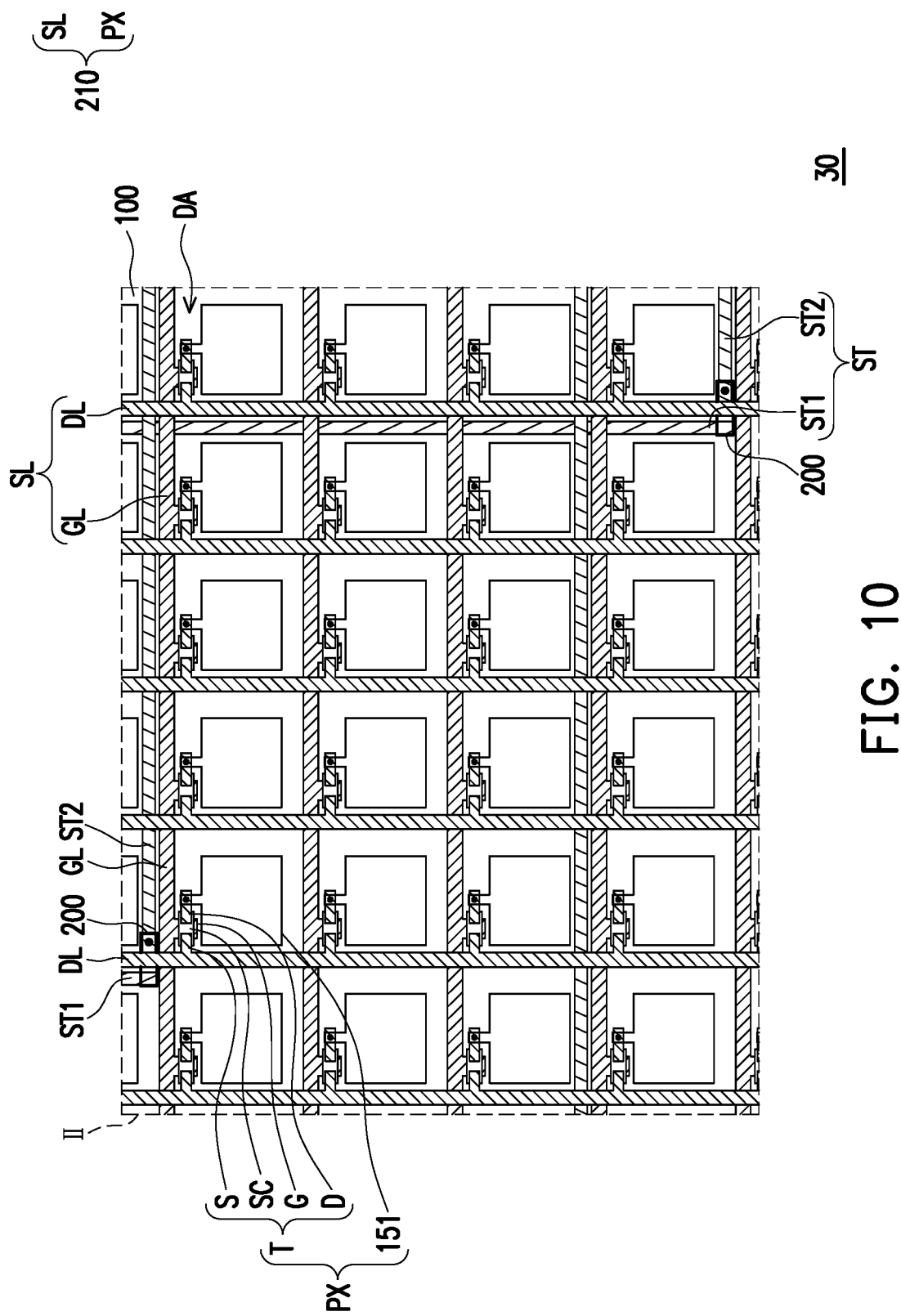
FIG. 10 is an enlarged view of a display panel of the sixth embodiment of the invention.
Figure 11:
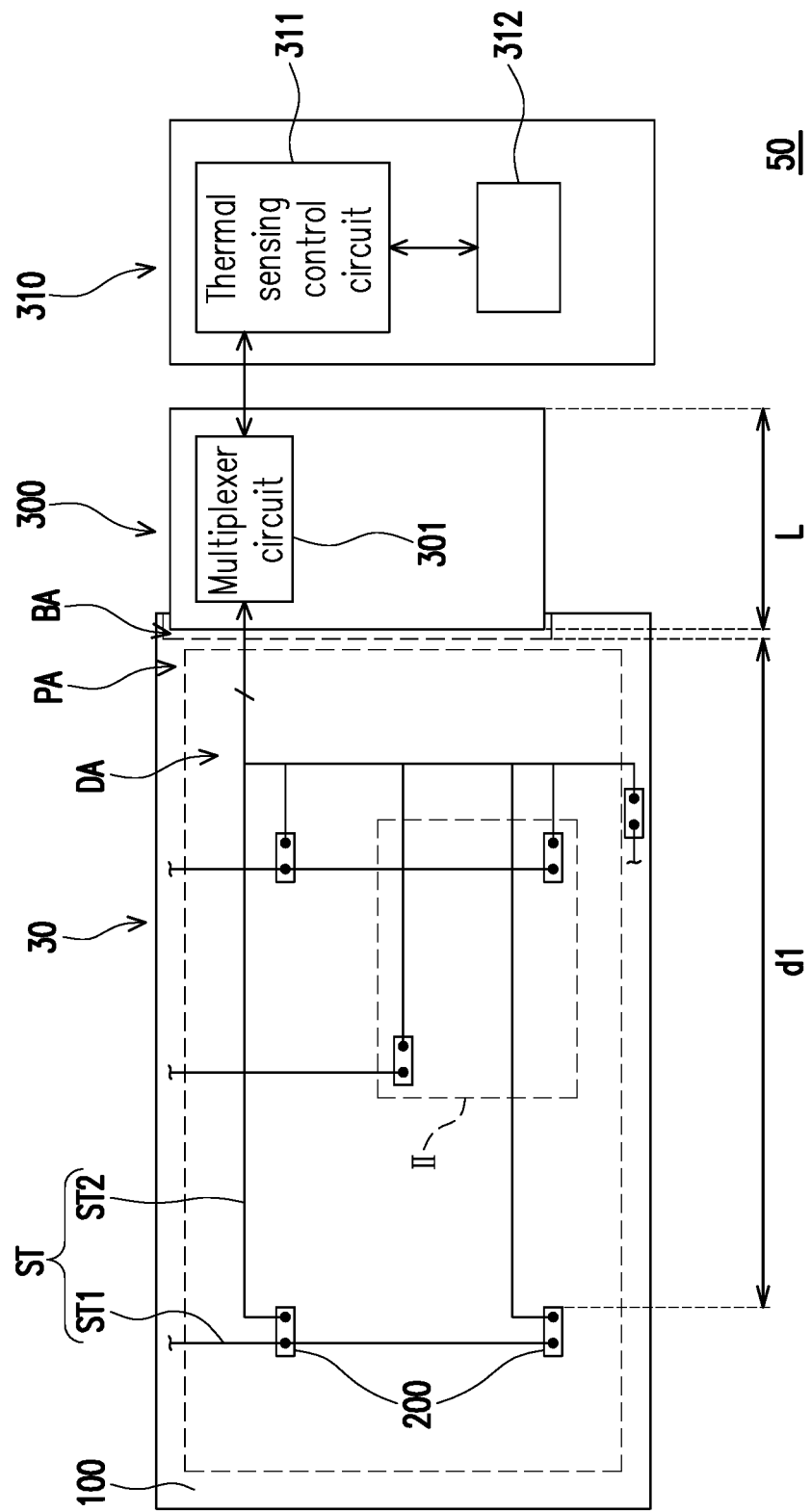
FIG. 11 is a schematic view of a display apparatus of an embodiment of the invention.

FIG. 10 is an enlarged view of a display panel 30 of the sixth embodiment of the invention. FIG. 11 is a schematic of a display apparatus 50 of an embodiment of the invention. It should be noted that FIG. 10 corresponds to a partial area II of the display panel 30 of FIG. 11, and for clarity of presentation, the display panel 30 of FIG. 11 omits the illustration of the pixel layer 210 of FIG. 10. As may be seen from FIG. 11, although six thermal sensors 200 of the display panel 30 are illustrated in the present embodiment, the invention is not limited thereto.

Referring to FIG. 10, the difference between the display panel 30 of the present embodiment and the display panel 10 is that the extending direction of the control line ST2 of the display panel 30 is intersected with the extending direction of the ground line ST1. In detail, the extending direction of the ground line ST1 may be optionally parallel to the extending direction of the data lines DL, and the extending direction of the control line ST2 may be optionally parallel to the extending direction of the scan lines GL. In addition, in the present embodiment, the ground line ST1 and the control line ST2 may optionally belong to different conductive layers, so that the ground line ST1 is electrically independent from the control line ST2. However, the invention is not limited thereto, and in some embodiments, the ground line ST1 and the control line ST2 intersected with each other may also belong to the same conductive layer. For example, one of the ground line ST1 and the control line ST2 has a disconnection, and the two parts separated by the disconnection are electrically connected to each other via a bridge pattern, and the other of the ground line ST1 and the control line ST2 is disposed through the disconnection, that is, the ground line ST1 and the control line ST2 are electrically insulated from each other via a jumper method.

Referring to FIG. 11, the display apparatus 50 includes the display panel 30 and a flexible circuit board 300. The display panel 30 also has a bonding area BA located in the periphery of the display area DA, and the flexible circuit board 300 is bonded to the bonding area BA of the display panel 30. In the present embodiment, a distance dl between a vertical projection of at least one of the plurality of thermal sensors 200 on the substrate 100 and a vertical projection of an area occupied by the bonding BA on the substrate 100 may be optionally greater than a length L of the flexible circuit board 300. In addition, in the present embodiment, the thermal sensors 200 may also be disposed in the peripheral area PA outside the display area DA. In other words, the location of the thermal sensors 200 at the display panel 30 may be adjusted according to different panel designs. In this way, the margin for configuration of the thermal sensors may be increased, and the accuracy of thermal sensing may be improved.

In addition, the display apparatus 50 further includes a driving circuit board 310 and a thermal sensing control circuit 311. The flexible circuit board 300 is connected between the driving circuit board 310 and the display panel 30. The thermal sensing control circuit 311 is disposed on the driving circuit board 310, and the thermal sensing control circuit 311 is in electrical communication with the sensing traces ST via the flexible circuit board 300. Specifically, the current signal generated by the thermal of the area corresponding to the thermal sensors 200 of the display panel 30 may be transmitted to the thermal sensing control circuit 311 via the flexible circuit board 300 via the sensing traces ST.

In the present embodiment, the display apparatus 50 may also optionally include a multiplexer circuit 301, and the multiplexer circuit 301 may be optionally disposed on the flexible circuit board 300. The multiplexer circuit 301 is connected between the thermal sensing control circuit 311 and the sensing traces ST. In some embodiments, the multiplexer circuit 301 may be optionally disposed on the display panel. In some other embodiments, the multiplexer circuit 301 may also be integrated in the thermal sensing control circuit 311.

In detail, the six thermal sensors 200 of the display panel 30 generate different current signals due to the temperature difference of the respective areas. The current signals may be transmitted to the multiplexer circuit 301 on the flexible circuit board 300 respectively via the sensing traces ST corresponding to the thermal sensors 200, and the thermal sensing control circuit 311 may sequentially obtain current signals generated by different thermal sensors 200 via the operation of the multiplexer circuit 301, and the current signals are further converted into digital signals and provided to a computing system for analysis.

As may be seen from FIG. 11, the display apparatus 50 may also optionally include a driver chip 312, and the thermal sensing control circuit 311 is connected between the multiplexer circuit 301 and the driver chip 312. In the present embodiment, the driver chip 312 is, for example, a system-on-chip (SOC), which may be used to analyze the digital signal provided by the thermal sensing control circuit 311, and the driving signals of a plurality of pixel structures in each area where the thermal sensors 200 are located may be dynamically adjusted according to the analysis result to help improve display quality.

Based on the above, the display panel and the display apparatus of an embodiment of the invention are attached on the substrate via the thermal sensors, and the sensing traces connected to the thermal sensors are electrically independent from the data lines and the scan lines electrically connected to the pixel structures, and therefore the accuracy of thermal sensing may be effectively improved, thus improving display quality.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display panel, comprising:
a substrate having a display area;
a thermal sensor disposed on the substrate;
a plurality of sensing traces disposed on the substrate and connected to the thermal sensor;
a pixel layer disposed on the substrate, wherein the pixel layer comprises a plurality of pixel structures and a plurality of signal lines, the pixel structures are located in the display area and connected to the signal lines, the signal lines of the pixel layer are independent from the sensing traces, and the thermal sensor is located between two of the pixel structures and is located in the display area; and
a display medium layer disposed on the substrate, and the pixel layer is located between the display medium layer and the substrate,
wherein the signal lines of the pixel layer comprise a scan line and a data line with an extending direction intersected an extending direction of the scan line, the sensing traces comprise a ground line and a control line, a film layer of the ground line is the same as one of the scan line and the data line, and a film layer of the control line is the same as the other of the scan line and the data line.

2. The display panel of claim 1, wherein the thermal sensor is located between the substrate and the pixel layer.

3. The display panel of claim 1, wherein the substrate has a groove, and the thermal sensor is buried in the groove.

4. A display apparatus, comprising:
a display panel, comprising:
a substrate having a display area and a bonding area located in a periphery of the display area;
a thermal sensor disposed on the substrate and located in the display area;
a plurality of sensing traces disposed on the substrate and connected to the thermal sensor;
a pixel layer disposed on the substrate, wherein the pixel layer comprises a plurality of pixel structures and a plurality of signal lines, the pixel structures are located in the display area and connected to the signal lines, and the thermal sensor is located between two of the pixel structures and is located in the display area; and
a display medium layer disposed on the substrate, and the pixel layer is located between the display medium layer and the substrate; and
a flexible circuit board bonded to the bonding area of the substrate,
wherein a distance from the thermal sensor to the bonding area is greater than a length of the flexible circuit board.

5. The display apparatus of claim 4, further comprising:
a driving circuit board, wherein the flexible circuit board is connected between the driving circuit board and the display panel; and
a thermal sensing control circuit disposed on the driving circuit board, and the thermal sensing control circuit electrically communicates with the sensing traces via the flexible circuit board.

6. The display apparatus of claim 5, wherein a number of the thermal sensors is a plural, and the display apparatus further comprises a multiplexer circuit connected between the thermal sensing control circuit and the sensing traces.

7. The display apparatus of claim 6, wherein the multiplexer circuit is integrated in the thermal sensing control circuit.

8. A method of fabricating a display panel, comprising:
providing a substrate having a display area;
bonding a thermal sensor to the display area of the substrate;
fabricating a sensing trace, wherein the sensing trace is connected to the thermal sensor; and
forming a pixel layer and a display medium layer on the substrate, wherein the pixel layer is located between the display medium layer and the substrate, and the pixel layer comprises a plurality of pixel structures and a plurality of signal lines, and the thermal sensor is located between two of the pixel structures and is located in the display area,
wherein the signal lines of the pixel layer comprise a scan line and a data line with an extending direction intersected an extending direction of the scan line, the sensing trace comprises a ground line and a control line, a film layer of the ground line is the same as one of the scan line and the data line, and a film layer of the control line is the same as the other of the scan line and the data line.

9. The method of fabricating the display panel of claim 8, further comprising fabricating a groove on the substrate, wherein the thermal sensor is disposed in the groove.

10. The method of fabricating the display panel of claim 9, wherein the groove is formed on the substrate via an etching process.

11. The method of fabricating the display panel of claim 8, wherein the bonding the thermal sensor to the substrate comprises deposition sintering, soldering, or adhesion.

* * * * *